United States Patent
Cooper

(10) Patent No.: US 7,218,344 B2
(45) Date of Patent: May 15, 2007

(54) SYSTEM AND METHOD FOR EFFICIENTLY PERFORMING A WHITE BALANCE OPERATION

(75) Inventor: Ted J Cooper, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 966 days.

(21) Appl. No.: 10/217,855

(22) Filed: Aug. 13, 2002

(65) Prior Publication Data
US 2003/0035156 A1    Feb. 20, 2003

Related U.S. Application Data

(60) Provisional application No. 60/312,626, filed on Aug. 15, 2001.

(51) Int. Cl.
H04N 9/73    (2006.01)
G06K 9/00    (2006.01)

(52) U.S. Cl. .............. 348/223.1; 348/225.1; 382/167

(58) Field of Classification Search ........... 348/223.1, 348/225.1, 655; 382/167; 358/522
See application file for complete search history.

(56) References Cited

U.S. PATENT DOCUMENTS

| | | | |
|---|---|---|---|
| 6,181,321 B1 * | 1/2001 | Zhao et al. | 345/617 |
| 6,377,702 B1 * | 4/2002 | Cooper | 382/167 |
| 6,788,813 B2 * | 9/2004 | Cooper | 382/167 |
| 6,791,606 B1 * | 9/2004 | Miyano | 348/223.1 |
| 2003/0052978 A1 * | 3/2003 | Kehtarnavaz et al. | 348/223.1 |
| 2005/0212928 A1 * | 9/2005 | Classen et al. | 348/223.1 |

* cited by examiner

*Primary Examiner*—Lin Ye
*Assistant Examiner*—J. Douglas
(74) *Attorney, Agent, or Firm*—Gregory J. Koerner; Redwood Patent Law

(57) ABSTRACT

A system and method for efficiently performing a white balance operation preferably includes an electronic camera device that captures image data using a imaging device. A color manager may then convert the captured image data into perceptual color space data. The color manager may next create a histogram of chromaticity vectors corresponding to pixels from the perceptual color space data. The color manager may then derive a neutral core vector corresponding to a neutral core peak from the histogram. The color manager may advantageously utilize the neutral core vector to identify a scene illuminant corresponding to color channel amplifier gains, and may then adjust the captured image data with the color channel amplifier gains to thereby complete the white balance operation.

63 Claims, 13 Drawing Sheets

SYSTEM AND METHOD FOR EFFICIENTLY PERFORMING A WHITE BALANCE OPERATION

CROSS-REFERENCE TO RELATED APPLICATIONS

This application relates to, and claims priority in, U.S. Provisional Patent Application Ser. No. 60/312,626, entitled "Perform Illumination Estimation From Raw Data By Using The Neutral Core Of Pixels In A Perceptual Space" that was filed on Aug. 15, 2001. The related applications are commonly assigned.

BACKGROUND SECTION

1. Field of the Invention

This invention relates generally to techniques for manipulating data, and relates more particularly to a system and method for efficiently performing a white balance operation in the field of digital imaging.

2. Description of the Background Art

Implementing efficient methods for manipulating data is a significant consideration for designers and manufacturers of contemporary electronic devices. However, effectively manipulating data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that efficiently captures and manipulates digital image data may benefit from an efficient implementation because of the large amount and complexity of the digital data involved.

In certain electronic cameras that capture digital image data, a white balancing operation may be required. In practice, the human visual system does not perceive the same amount of light and the same colors that an electronic camera captures as image data. White balancing operations therefore adjust the image data captured by the electronic camera, so that a resultant captured image appears the same as the image that was originally perceived by the human eye.

Due to growing demands on system resources and substantially increasing data magnitudes, it is apparent that developing new techniques for manipulating data is a matter of concern for related electronic technologies. Therefore, for all the foregoing reasons, developing efficient systems for manipulating data remains a significant consideration for designers, manufacturers, and users of contemporary electronic devices.

SUMMARY

In accordance with the present invention, a system and method are disclosed for efficiently performing a white balance operation. In one embodiment, initially, an electronic camera device generates captured image data using a imaging device. A color manager or other appropriate entity may then preferably decimate the pixels of captured image data to reduce the overall number of pixels by utilizing any appropriate and effective technique. For example, the color manager may exclude every "nth" pixel from the capture image data. In certain embodiments, pixels with values under a predetermined threshold value may also be eliminated.

The color manager or other appropriate entity may next preferably convert the foregoing decimated pixels into a perceptual color space. For example, the color manager may convert the decimated pixels into a three-dimensional perceptual color space that includes one luminance coordinate and two color coordinates, such as the L*a*b* color space, or into any other suitable and effective color space.

The color manager or other appropriate entity may then preferably calculate chromaticity vectors for each pixel from the perceptual color space, and may also preferably group the foregoing chromaticity vectors into a series of contiguous theta bins that may be presented as a histogram with one or more peaks each corresponding to total counts of the chromaticity vectors in the foregoing theta bins. In this context, "theta bins" refer to a measure of a pixel's hue range over the colors of the rainbow. Typically, the range is red, orange, yellow, green, blue, indigo, and violet. However, the starting point for the foregoing color sequence may not be critical.

The color manager or other appropriate entity may preferably identify a neutral core peak from the histogram by utilizing any effective techniques. For example, in certain embodiments, the color manager may preferably identify the foregoing neutral core peak as the "blue-est" peak in the blue region of the theta bins from the histogram that possess sufficient count amplitude and luminance range.

The color manager or other appropriate entity may preferably also derive a neutral core vector from data values corresponding to the foregoing neutral core peak by utilizing any appropriate techniques. For example, in certain embodiments, the color manager may preferably calculate averages of L*, a*, and b* values for all chromaticity vectors in the theta bin(s) that correspond to the neutral core peak to thereby determine L*a*b* coordinates of the neutral core vector.

The color manager or other appropriate entity may then preferably compare the neutral core vector with reference vectors from various known standard illuminants to identify the scene illuminant corresponding to the captured image data. Finally, the color manager or other appropriate entity may preferably access color amplifier gains for primary color channels of the camera device based upon the identified scene illuminant by using any appropriate means. For example, the color manager may reference one or more lookup tables with the identified scene illuminant to determine the correct color amplifier gains for that illuminant.

The color manager or other appropriate entity may then preferably utilize the referenced color amplifier gains to adjust the gains of primary color channels in the camera device, to thereby complete the white balance operation in accordance with the present invention. The present invention thus provides an improved system and method for efficiently performing a white balance operation.

DETAILED DESCRIPTION

The present invention relates to an improvement in data manipulation techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for efficiently performing a white balance operation, and preferably includes an electronic camera device that captures image data using a imaging device. A color manager may then convert the captured image data into perceptual color space data. The color manager may next create a histogram of chromaticity vectors corresponding to pixels from the perceptual color space data. The color manager may derive a neutral core vector corresponding to a neutral core peak from the histogram. The color manager may advantageously utilize the neutral core vector to identify a scene illuminant corresponding to color channel amplifier gains, and may then adjust the captured image data with the color channel amplifier gains to thereby complete the white balance operation.

Figure 1:
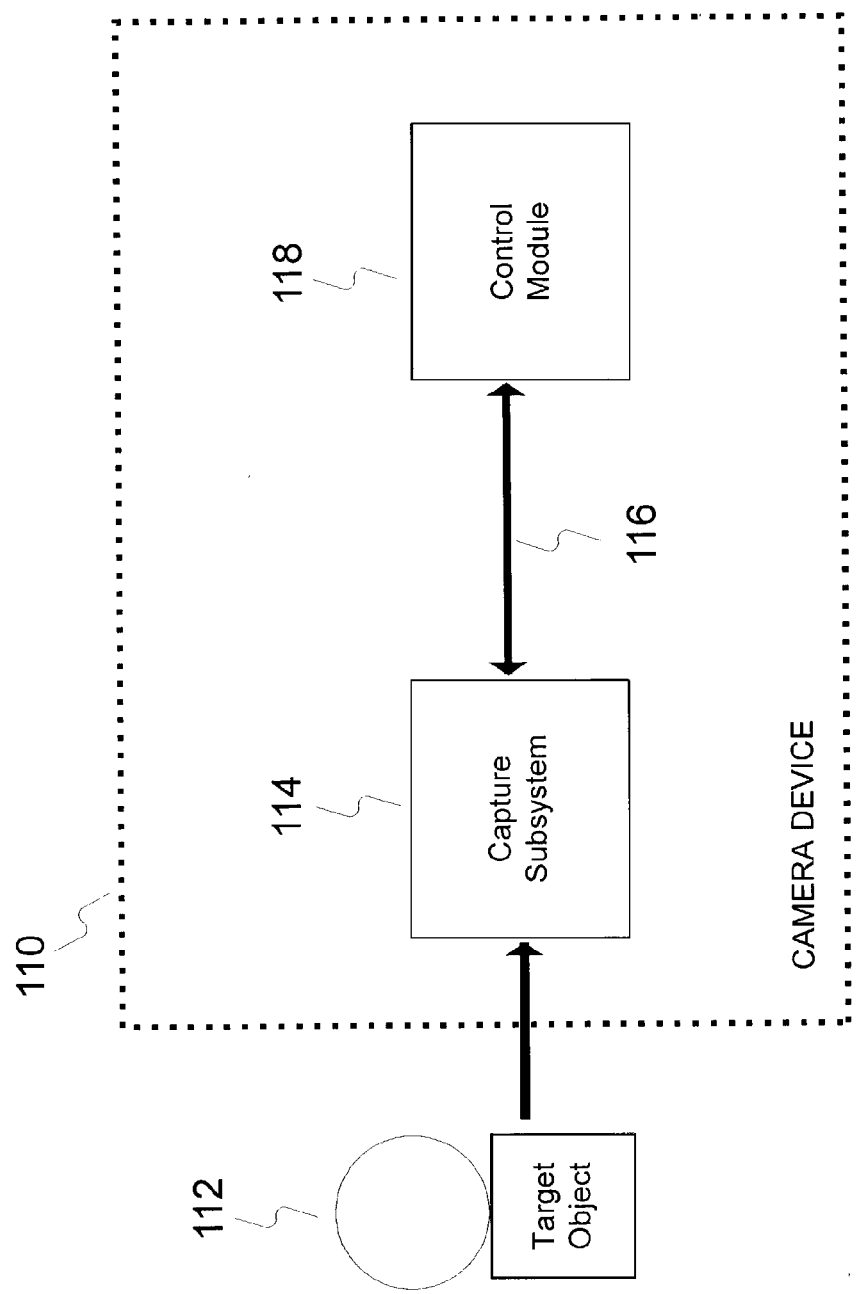
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a target object 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may readily be implemented as a scanner device or a video camera device.

In the FIG. 1 embodiment, once a system user has focused capture subsystem 114 on target object 112 and requested camera device 110 to capture image data corresponding to target object 112, then control module 118 may preferably instruct capture subsystem 114 via system bus 116 to capture image data representing target object 112. The captured image data may then be transferred over system bus 116 to control module 118, which may responsively perform various processes and functions with the image data. System bus 116 may also bidirectionally pass various status and control signals between capture subsystem 114 and control module 118.

Figure 2:
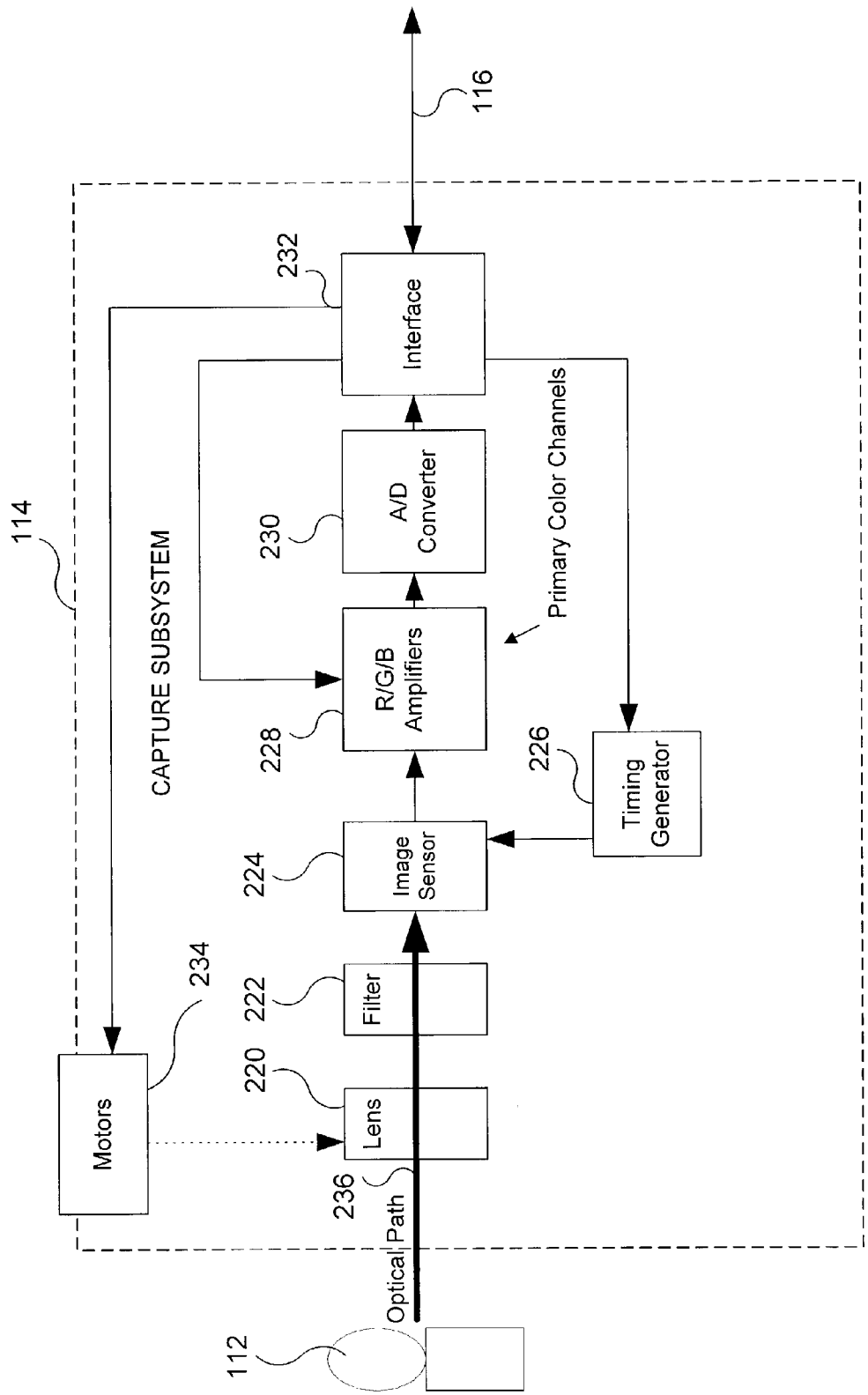
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, imaging device 114 preferably comprises, but is not limited to, a lens 220 having an iris (not shown), a filter 222, an image sensor 224, a timing generator 226, red, green, and blue amplifiers 228, an analog-to-digital (A/D) converter 230, an interface 232, and one or more motors 234 to adjust the focus of lens 220. In alternate embodiments, capture subsystem 114 may readily include various other components in addition to, or instead of, those components discussed in conjunction with the FIG. 2 embodiment.

In the FIG. 2 embodiment, capture subsystem 114 may preferably capture image data corresponding to target object 112 via reflected light impacting image sensor 224 along optical path 236. Image sensor 224, which may preferably include a charged-coupled device (CCD), may responsively generate a set of image data representing the target object 112. The image data may then be routed through red, green, and blue amplifiers 228, A/D converter 230, and interface 232. Interface 232 may preferably include separate interfaces for controlling ASP 228, motors 234, timing generator 226, and red, green, and blue amplifiers 228. From interface 232, the image data passes over system bus 116 to control module 118 for appropriate processing and storage. Other types of image capture sensors, such as CMOS or linear arrays are also contemplated for capturing image data in conjunction with the present invention. For example, the image capture sensors preferably include three or more primary color channels (for example, Cyan/Magenta/Yellow/Green (C/M/Y/G) is also considered).

Figure 3:
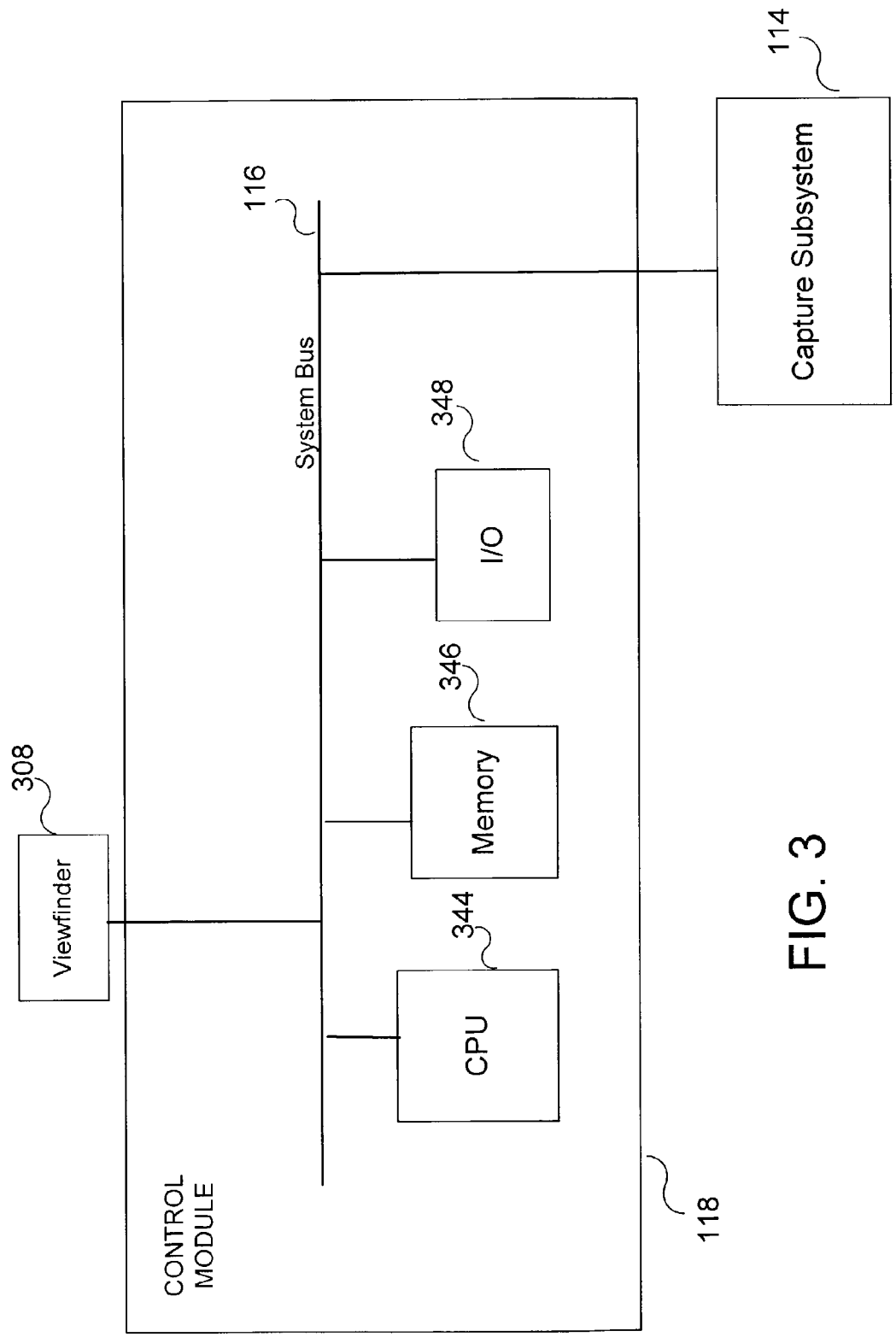
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may preferably be implemented to include any appropriate microprocessor device. Alternately, CPU 344 may be implemented using any other appropriate technology. For example, CPU 344 may be implemented to include certain application-specific integrated circuits (ASICS) or other appropriate electronic devices. Memory 346 may preferably be implemented as one or more appropriate storage devices, including, but not limited to, read-only memory, random-access memory, and various types of non-volatile memory, such as floppy disc devices, hard disc devices, or flash memory. I/O 348 preferably may provide one or more effective interfaces for facilitating bi-directional communications between camera device 110 and any external entity, including a system user or another electronic device. I/O 348 may be implemented using any appropriate input and/or output devices. The operation and utilization of control module 118 is further discussed below in conjunction with FIGS. 4 through 11.

Figure 4:
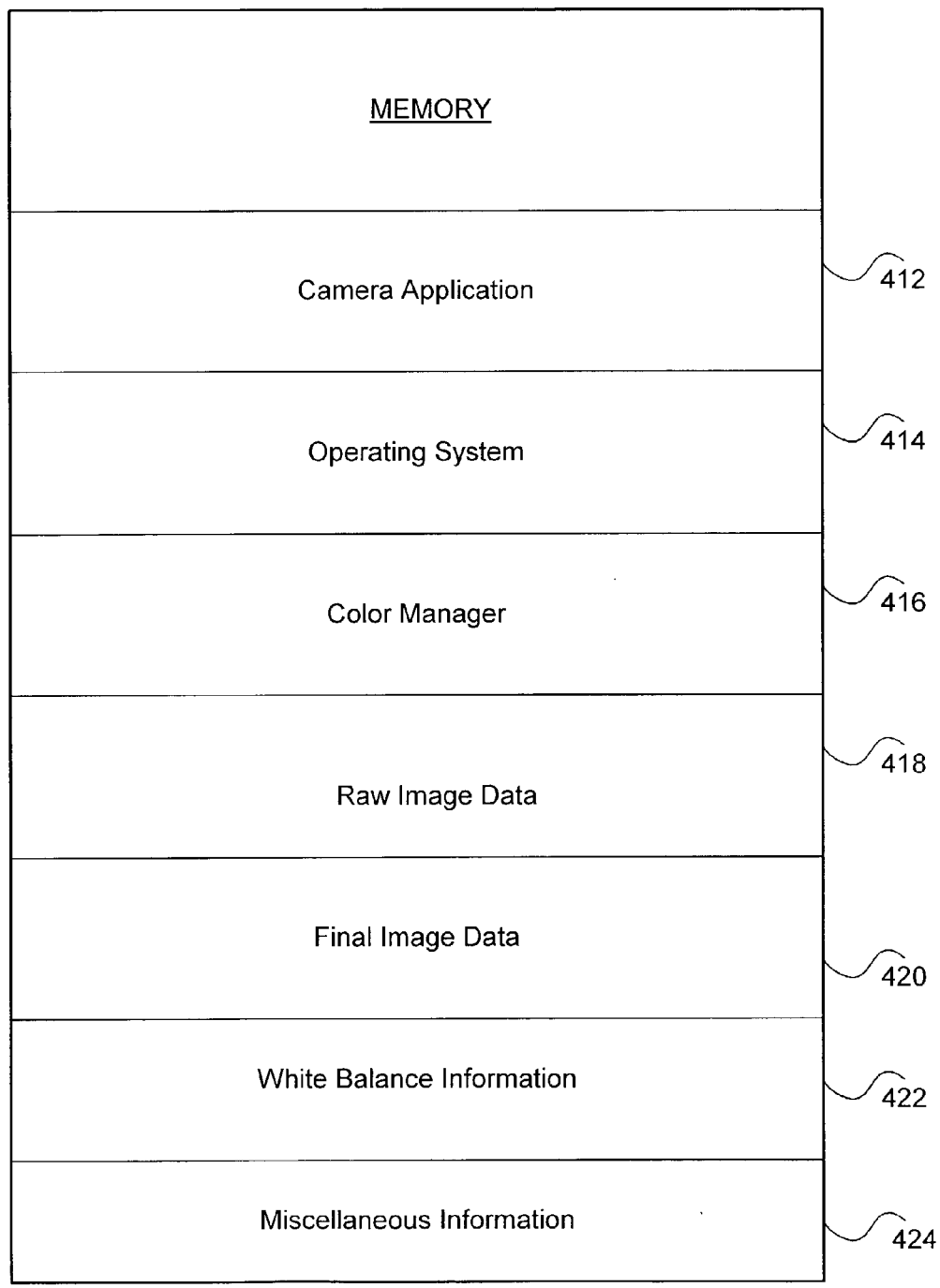
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may preferably include, but is not limited to, a camera application 412, an operating system 414, a color manager 416, raw image data 418, final image data 420, white balance information 422, and miscellaneous information 424. In alternate embodiments, memory 346 may readily include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, color manager 416 may preferably control and coordinate a white balance operation for image data 422 captured by camera device 110. The functionality of color manager 416 is further discussed below in conjunction with FIGS. 6 through 10D.

In the FIG. 4 embodiment, color manager 416 may preferably utilize raw image data 418 to perform a white balance operation to thereby produce final image data 420. White balance information 422 may preferably include any appropriate information or data that is utilized during the foregoing white balance operation. Miscellaneous information 424 may include any desired software instructions, data, or other information for facilitating various functions performed by camera device 110.

Figure 5:
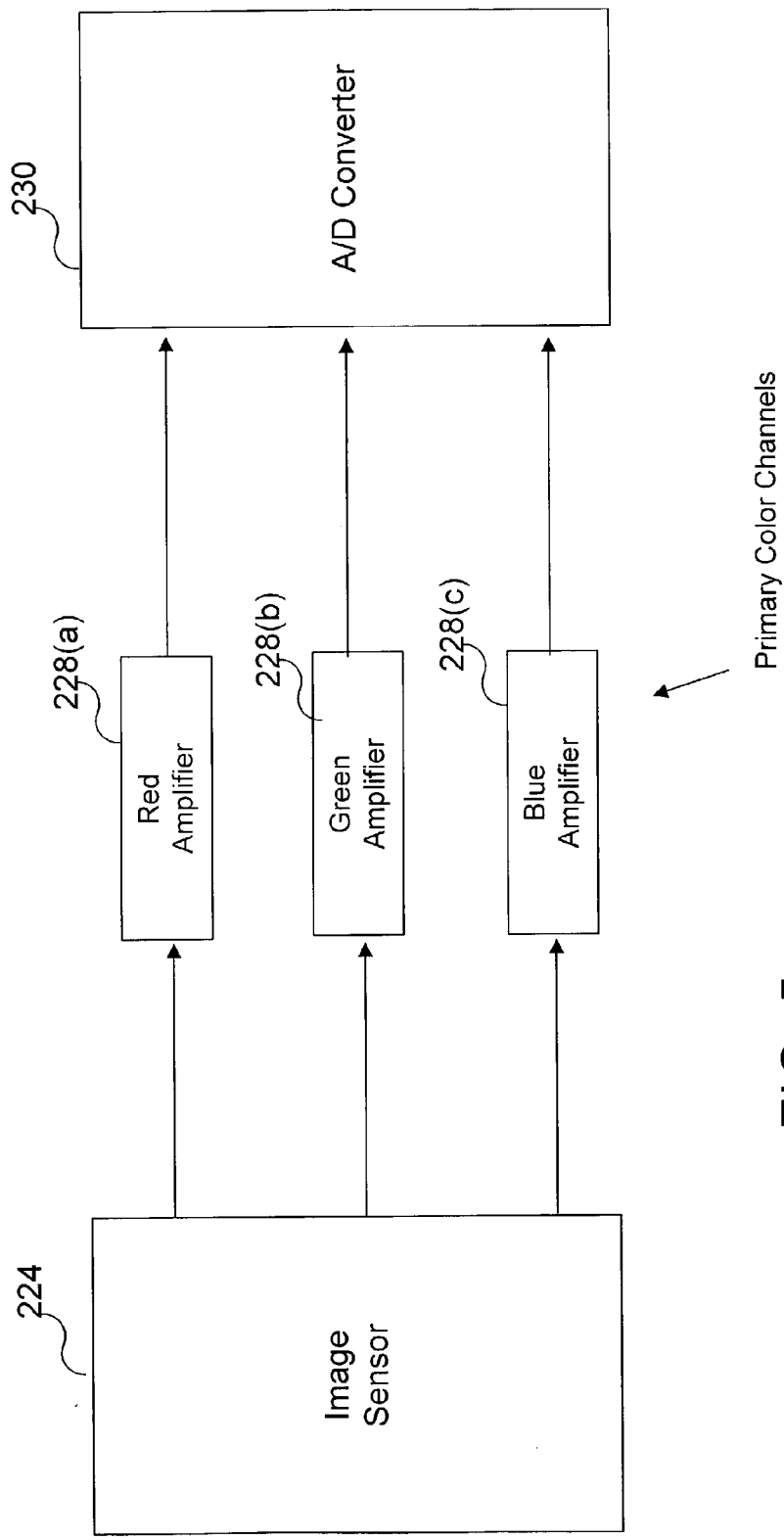
FIG. 5 is a block diagram for one embodiment of the red, green, and blue amplifiers of FIG. 2, in accordance with the present invention.

Referring now to FIG. 5, a block diagram of the FIG. 2 red, green, and blue amplifiers 228 is shown, in accordance with one embodiment of the present invention. In alternate embodiments of the present invention, red, green, and blue amplifiers 228 may readily be implemented to include various other configurations, and may also include various items and components that are different from those discussed in conjunction with the FIG. 5 embodiment. For example, in certain embodiments, red, green, and blue amplifiers 228 may readily be implemented in other locations in camera device 110, such as following A/D converter 230 or within the capture device itself.

In the FIG. 5 embodiment, image sensor 224 may preferably generate a red sensor output to a red amplifier 228(*a*) which may responsively provide an amplified red output to A/D converter 230. Red amplifier 228(*a*) may preferably adjust the signal amplitude of the red sensor output according to a red amplification value referred to herein as red gain. Similarly, image sensor 224 may preferably generate a green sensor output to a green amplifier 228(*b*) which may responsively provide an amplified green output to A/D converter 230. Green amplifier 228(*b*) may preferably adjust the signal amplitude of the green sensor output according to a green amplification value referred to herein as green gain.

In addition, image sensor 224 may preferably generate a blue sensor output to a blue amplifier 228(*c*) which may responsively provide an amplified blue output to A/D converter 230. Blue amplifier 228(*c*) may preferably adjust the signal amplitude of the blue sensor output according to a blue amplification value referred to herein as blue gain. In accordance with the present invention, image sensor 224 may be implemented using any appropriate image capture technology. Improved techniques for adjusting the respective gains of red, green, and blue amplifiers 428 in order to achieve an appropriate white balance for current lighting conditions is further discussed below in conjunction with FIGS. 6 through 10D.

Figure 6:
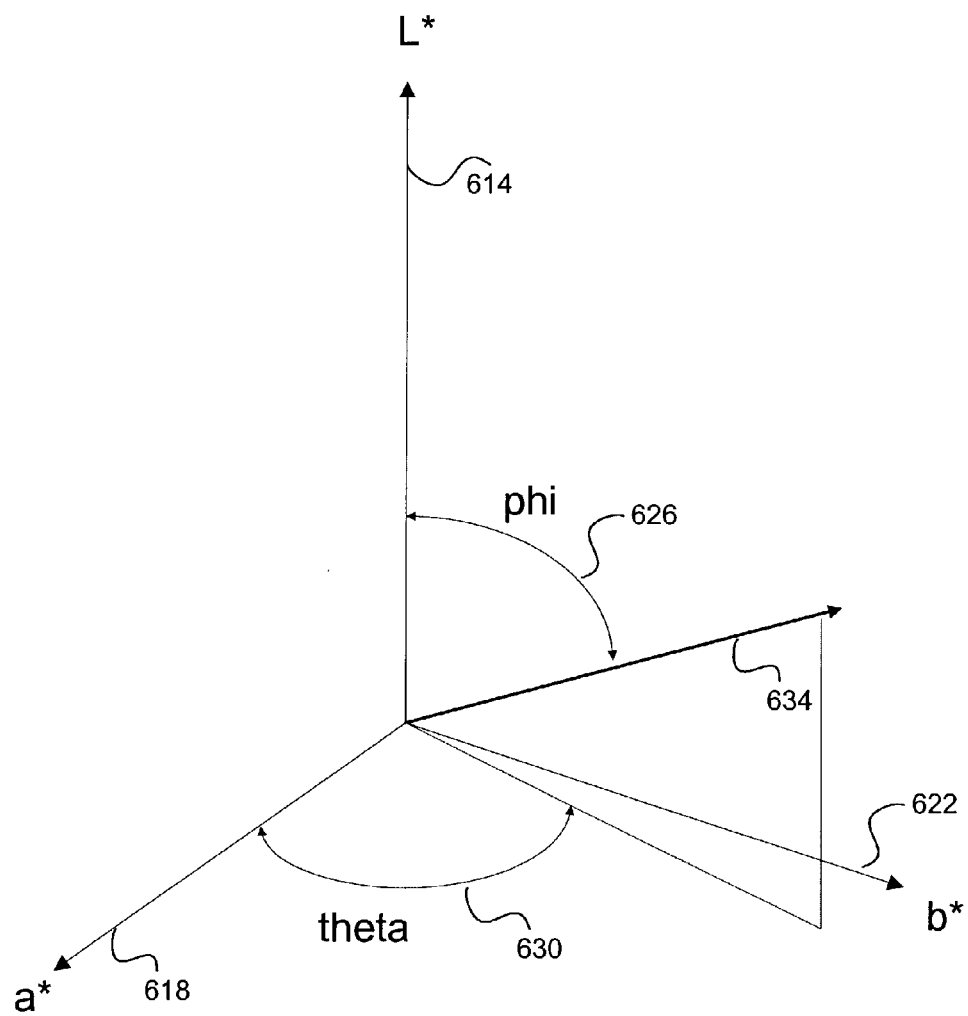
FIG. 6 is a graph illustrating a chromaticity vector in three-dimensional perceptual color space, in accordance with the present invention.

Referring now to FIG. 6, a graph illustrating a chromaticity vector 734 in three-dimensional perceptual color space 610 is shown, in accordance with one embodiment of the present invention. In alternate embodiments, the present invention may readily utilize chromaticity vectors 610 that are implemented in various other color spaces (such as Luv or HSV), and may also include various items and configurations that are different from those discussed in conjunction with the FIG. 6 embodiment.

In the FIG. 6 embodiment, perceptual color space 610 may preferably be implemented as a conventional L*a*b* color-space representation with a horizontal "a*" axis 618 (green to magenta), a horizontal "b*" axis 622 (yellow to blue), and a vertical luminance L* axis 614. The FIG. 6 embodiment also includes an exemplary chromaticity vector 634 that corresponds to a particular pixel. Also shown is a phi angle 626 which is the declination angle of chromaticity vector 634 from L* axis 614. The FIG. 6 embodiment also includes a theta angle 630 corresponding to chromaticity vector 634. Theta angle 630 preferably describe the angle of chromaticity vector 634 from a* axis 618 in the same plane as a* axis 618 and b* axis 622.

A goal of the present invention is illuminant estimation (IE) of captured image data to determine the relative gains of the primary color amplifiers 228 needed for this particular illuminant. The present invention requires selected L*a*b* pixels to be histogrammed. The histogram variable is theta 630 which is preferably equal to the ArcTan(b*/a*). Theta may be considered to be the hue of chromaticity vector 634. In this embodiment, theta is the hue (chromaticity) angle defined in the CIE L*a*b* procedures. It represents a cyclical variable that describes what color the L*a*b* pixel refers to in a uniform perceptual color space. While the angle theta 630 shows what "color" a pixel refers to, the phi angle 626 gives an indication of how saturated the same given pixel is.

The present invention may then preferably divide the circular plane of a* 618 and b* 622 into a number of contiguous theta bins. In the FIG. 6 embodiment, approximately 158 theta bins may preferably be utilized. However, in other embodiments, any appropriate and effective number of theta bins may be utilized. A chromaticity vector 634 for each selected pixel from image data in the perceptual color space may then be calculated. A separate "count" for each chromaticity vector 634 may then be assigned to the appropriate theta bin, depending upon the theta value of the corresponding chromaticity vector 634. In accordance with the present invention, the counts in the foregoing theta bins may then be converted into a histogram, as discussed below in conjunction with FIG. 7.

Figure 7:
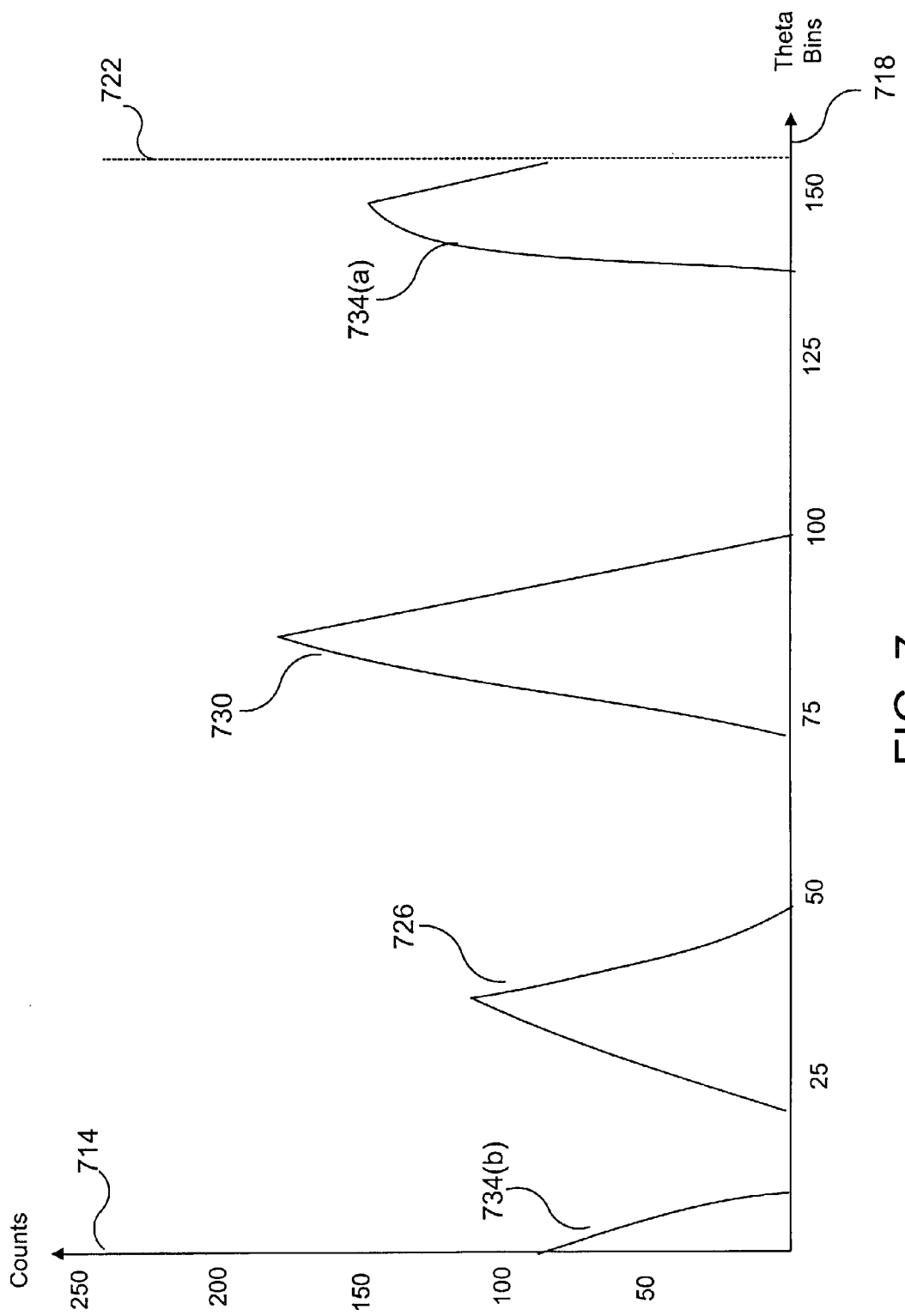
FIG. 7 is a graph of an exemplary histogram, in accordance with one embodiment of the present invention.

Referring now to FIG. 7, a graph of an exemplary histogram 710 is shown, in accordance with one embodiment of the present invention. The histogram 710 of FIG. 7 is presented for purposed of illustration, and in alternate embodiments of the present invention, histogram 710 may readily include other coordinates and waveforms in various configurations that are different from those discussed in conjunction with the FIG. 7 embodiment.

In the FIG. 7 example, the horizontal axis 718 of histogram 710 may preferably display reference numbers corresponding to the contiguous theta bins discussed above in conjunction with FIG. 6. In addition, in the FIG. 7 embodiment, the vertical axis 714 of histogram 710 may preferably display the number of "counts" (a total number of chromaticity vectors 634 assigned to the various theta bins for a given captured image) as discussed above in conjunction with FIG. 6.

In the FIG. 7 example, histogram 710 includes a peak 726 and a peak 730. In addition, histogram 710 also includes a peak 734(a) which "wraps around" at axis 722 (corresponding to highest theta bin 158) to include peak 734(b) which has counts from theta bins beginning at theta bin 1. In the FIG. 7 embodiment, theta bins corresponding to the blue range of chromaticity angles 634 preferably begin at the higher end of theta bins along horizontal axis 718 (the right side of histogram 710), and may, in certain instances, wrap around to include several theta bins on the lower end of histogram 710 (as illustrated in the FIG. 7 example). In alternate embodiments, a blue range may be located in other appropriate locations on various similar histograms.

In certain embodiments, after theta bin histogram 710 is generated by color manager 416 (FIG. 4) or by any other appropriate means, a state machine or some other computer process preferably examines the "counts" in the theta bins to find the first, second, and third largest peaks (peaks 1, 2, and 3, respectively). For example, in certain embodiments, a threshold may be set to find a new peak after the first peak is found. This threshold stops noisy data from giving false peaks. It is possible to have some special default value (like bin 0, a non-existent bin) to be the positions for peak 2 and 3 to indicate that there are no secondary peaks.

After the three dominant peaks are found, a series of three "IF" statements may be performed to see if peak 3 should be promoted to replace peak 2. The purpose of this process is to find the best potential candidate to compare against the largest theta bin histogram peak (always peak 1) to see which peak should be the ultimate winner. As discussed above, it should be noted that as one moves to the right of the theta peak 730 (peak 1), the theta bin colors become more blue. This characteristic is a consequence of the defining equation in which the theta angle equals the ArcTan (b*/a*). Also note that theta is a cyclical variable, and after going past theta bin 158, the variable "wraps around" to theta bin 1 which is slightly more blue than bin 158.

In the FIG. 7 embodiment, a first "IF" condition may preferably test whether peak 2 is to the left (i.e., has a lower theta bin number) than peak 1, AND, peak 3 is to the right of peak 1. When this condition is true, peak 3 preferably is promoted to replace peak 2. A second "IF" condition preferably tests whether peak 2 is to the right of peak 1, AND, peak 3 is to the right of peak 1. Again, when this condition is true, peak 3 is promoted to replace peak 2, and the old peak 2 becomes the new peak 3.

A third and last "IF" condition tests whether the potentially newly-promoted peak 2 is to the left of peak 1, AND, peak 1 and 2 are two-thirds of the way across the theta bin range, AND, peak 3 is located in less than the first one-third of the theta bin range. This corresponds to the wrap-around condition where peaks 1 and 2 are on the far right side of the theta bin range, and peak 3 is on the very start of the theta bin range. This means that peak 3 is more blue than peak 1. Again, when this condition is true, peak 3 is promoted to replace peak 2, and the old peak 2 becomes the new peak 3.

At this point, only two peaks are still being considered, namely, peak 1 (which is always the largest "count" value in the theta bin histogram) and peak 2 (which may have recently been promoted from peak 3). The default condition is that peak 1 will be considered the ultimate winner for the neutral core chromatic vector. The next question is whether the new peak 2 will replace peak 1 as the candidate for the ultimate winner. Before continuing, a new variable is preferably defined called "Ratio", which is preferably equal to the ratio of the histogram amplitudes of peak 2 divided by peak 1. When Ratio is a fractional number that is less than one, in a hardware configuration, it can easily be reconfigured to be peak1 divided by peak 2 to simplify calculations. A real division is not needed since "shifts and adds" are all that are required for the accuracy of Ratio to be meaningful in the following tests.

Again, in the FIG. 7 embodiment, there are preferably three new "IF" conditions that could make peak 2 a candidate to be the ultimate winner. The first "IF" condition preferably tests whether Ratio is greater than or equal to 3%, AND, peak 2 is to right of peak 1, AND, both peak 1 and 2 are ⅔ of the way along the theta bin index. This basically allows a small peak 2 amplitude in the very blue region on the right side of theta bin to become a candidate.

The second "IF" condition tests whether Ratio>=20%, AND, peak 2 to the right of peak1. This is very much like the first "IF" condition except that there are no conditions for where peaks 1 and 2 are located. In most cases, where there is a second peak, this is the "IF" condition that will promote peak 2 to being a candidate. It basically says that "a more blue peak than peak 1 exists and it is at least ⅕ as tall as the dominant peak" and should be considered a candidate.

The third "IF" condition preferably tests whether Ratio>=20%, AND, peak 2 is in the first ⅙ of theta bin index, AND peak 1 is in the last ⅔ of the theta bin index. Quite simply, this is the wrap-around case for peak 2 being more blue that peak 1. Again, a large amplitude of peak 2 is required to consider this case for peak 2 to be a candidate.

With regard to selecting the "blue-est" peak. In essence, this says that green and red colored illuminants are common, and can mimic each other with special filters. However, to obtain very blue illuminants in the D50 through D80 range (i.e., D5000 degrees Kelvin through D8000 degrees Kelvin daylight illuminance), no amount of filtering from incandescent light can give an efficient rendering of daylight because fluorescent and incandescent light sources have little illumination power in the 380 to 430 nanometer wavelengths. If there is significant deep blue content in the neutral core objects of the image, it must have come from the illuminant.

In the FIG. 7 embodiment, essentially, once the largest peak from the theta bins of histogram 710 is found (always called peak 1), then a search is made of other peaks to see if one of them is more blue than peak 1. If such a peak is found, there are a sequence of tests based on amplitude and range of brightness that must be passed for this new peak to supersede peak 1 as the neutral core peak.

In the FIG. 7 embodiment, the final condition tests whether peak 2's range is at least ½ the size of peak 1's range of brightness (i.e., L* values). If this is the case, then peak 2 wins, and the neutral core chromaticity vector will be computed from the theta bin where peak 2 is located. If peak 2 does not have a large range, then peak 1 is the winner, and the chromaticity vector will be computed from the theta bin belonging to peak 1. In the FIG. 7 embodiment, once the "winner" theta bin is found, the average chromatic vector is preferably computed. The SumL*, Suma*, and Sumb* values from that specific theta bin are divided by the "count" value for that bin, and the aveL*, ave_a*, and ave_b* values are found. This vector may then be designated as the neutral core vector for the current image under consideration.

In the FIG. 7 embodiment, locating the neutral core vector is described with reference to locating a blue-est peak on histogram 710. However, in other embodiments, peaks corresponding to other color ranges or color combinations from histogram 710 may alternately be utilized as a references to locate an appropriate neutral core vector.

Figure 8:
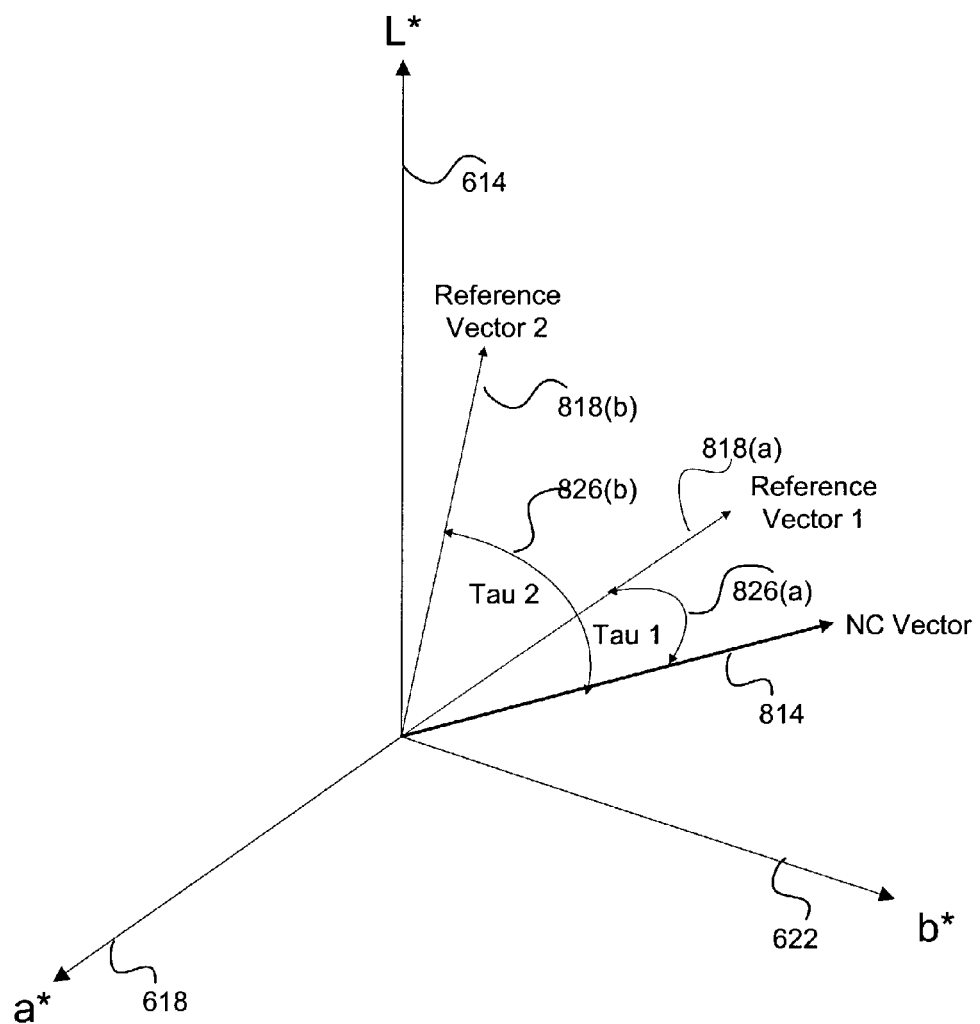
FIG. 8 is a graph illustrating a neutral core vector and two reference vectors in three-dimensional perceptual color space, in accordance with the present invention.

Referring now to FIG. 8, a graph illustrating a neutral core (NC) vector 814 and two reference vectors 818(a) and 818(b) in three-dimensional perceptual color space 810 is shown, in accordance with one embodiment of the present invention. In alternate embodiments, the present invention may readily utilize NC vectors and reference vectors that are implemented in various other color spaces, and may also include various elements, vectors, and configurations that are different from those discussed in conjunction with the FIG. 8 embodiment.

For example, although the FIG. 8 embodiment utilizes only two reference vectors 818 for purposes of clarity, in many embodiments, the present invention may typically compare NC vector 814 to a significantly larger number of reference vectors 818. For instance, reference vectors 818 may represent various illuminants that include, but are not limited to, D65 (midafternoon sunlight with slight overcast [6500 degrees Kelvin]), D50 (noonday sunlight [5000 degrees Kelvin]), U30 (fluorescent lighting), 3200 (studio floodlights [3200 degrees Kelvin]), A (tungsten incandescent lighting), and horizon (late afternoon sunlight).

In accordance with certain embodiments, color manager 416 or another appropriate entity may preferably compare NC vector 814 (as described above in conjunction with FIG. 7) with known reference vectors 818 to identify a closest matching reference vector. In the FIG. 8 embodiment, color manager 416 may preferably calculate tau angles 826(a) and 826(b) between NC vector 814 and respective reference vectors 818(a) and 818(b) to thereby identify the reference vector 818 corresponding to the smallest tau angle 826 as the scene illuminant associated with NC vector 814.

In the FIG. 8 embodiment, reference vector 1 (818(a)) corresponds to the smallest tau angle 1 (826(a)). In certain embodiments, the present invention may interpolate between two or more of the reference vectors 818 with the smallest tau angles 826, as discussed below. In the FIG. 8 embodiment, color manager 416 may then preferably reference amplifier gain lookup tables to determine known gain values (such as B/G and R/G values) for the identified illuminant, and may advantageously the adjust the respective gains of R/G/B amplifiers 228 (FIGS. 2 and 5) to complete the white balance operation.

Figure 9:
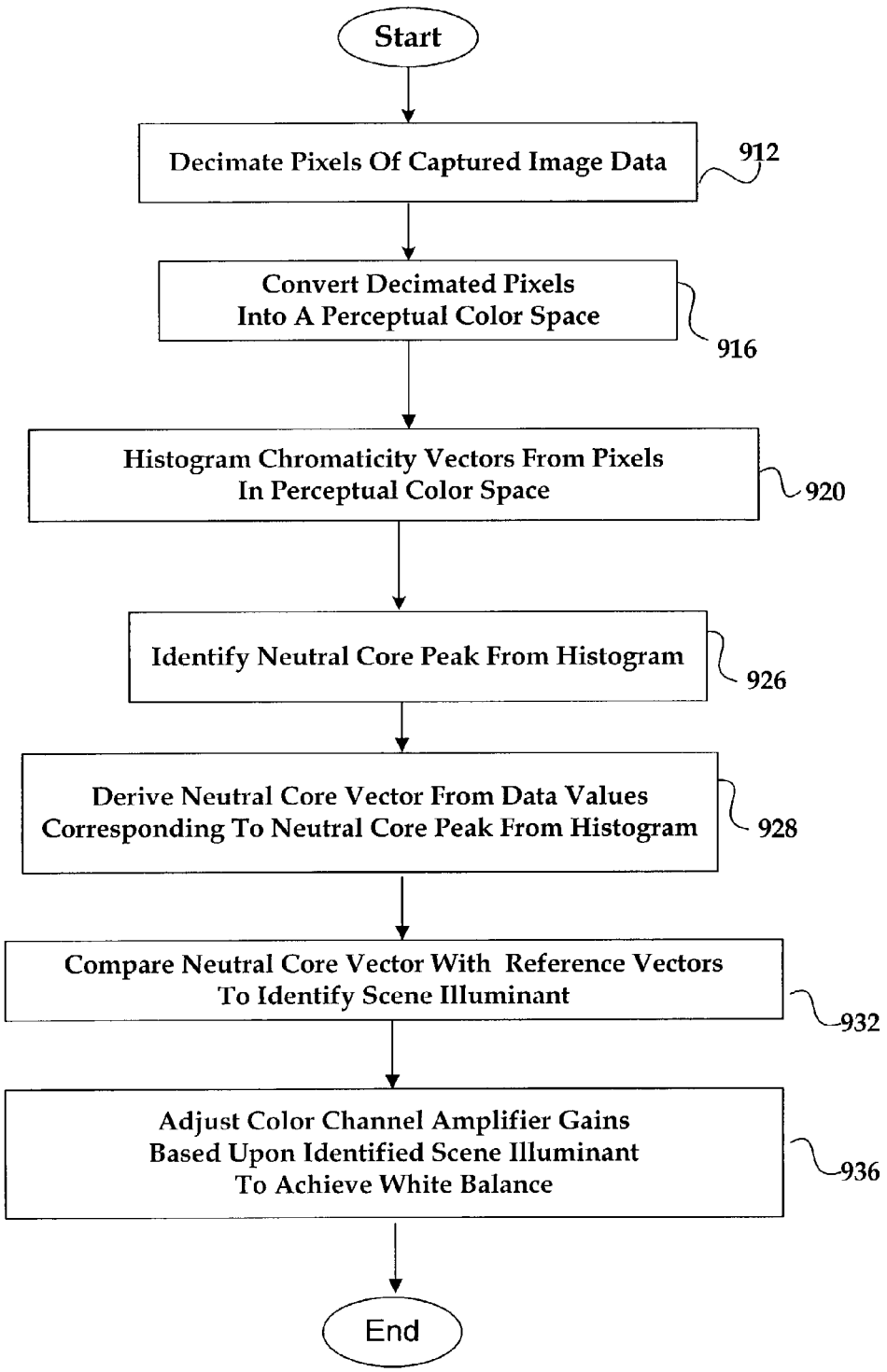
FIG. 9 is a flowchart of method steps for performing a basic neutral-core white-balance operation, in accordance with one embodiment of the present invention.

Referring now to FIG. 9, a flowchart of method steps for performing a basic neutral-core white-balance operation is shown, in accordance with one embodiment of the present invention. The FIG. 9 embodiment is presented for purposes of illustration, and in alternate embodiments, the present invention may readily utilize various other steps and sequences than those discussed in conjunction with the FIG. 9 embodiment.

In the FIG. 9 embodiment, in step 912, a color manager 416 or other appropriate entity may preferably decimate the pixels of captured image data to reduce the overall number of pixels by utilizing any appropriate and effective technique. For example, color manager 416 may exclude every "nth" pixel from the capture image data. In the FIG. 9 embodiment, the decimated image data may preferably retain in the range of slightly over 1000 pixels, however, in other embodiments, the decimated image data may include any suitable number of pixels. In certain embodiments, in step 912, pixels with values under a pre-determined threshold value may also be eliminated.

In step 916, color manager 416 or other appropriate entity may preferably convert the foregoing decimated pixels into a perceptual color space. For example, color manager 416 may convert the decimated pixels into a three-dimensional perceptual color space that includes one luminance coordinate and two color coordinates, such L*a*b* color space, or into any other suitable and effective color space.

In step 920, color manager 416 or other appropriate entity may preferably calculate chromaticity vectors 634 for each pixel from the perceptual color space, and may then preferably histogram the foregoing chromaticity vectors 634 into a series of contiguous theta bins that may be presented as a histogram 710 with one or more peaks each corresponding to total counts of the chromaticity vectors 634 in the foregoing theta bins.

In step 926, color manager 416 or other appropriate entity may preferably identify a neutral core peak 734 from histogram 710 by utilizing any effective techniques. For example, in the FIG. 9 embodiment, color manager 416 may preferably identify the foregoing neutral core peak 743 as the "blue-est" peak in the blue region of theta bins of histogram 710 that possesses sufficient count amplitude and luminance range.

In step 928, color manager 416 or other appropriate entity may preferably derive a neutral core vector 814 from data values corresponding to the foregoing neutral core peak 734 from histogram 710 by utilizing any appropriate techniques. For example, in the FIG. 9 embodiment, color manager 416 may preferably calculate averages of L*, a*, and b* values for all chromaticity vectors 634 in the theta bin(s) corresponding to the neutral core peak 734 to determine the L*a*b* coordinates of neutral core vector 814.

In step 932, color manager 416 or other appropriate entity may preferably compare the neutral core vector 814 with reference vectors 818 from various known standard illuminants to identify the scene illuminant corresponding to the captured image data. Finally, in step 936, color manager 416 or other appropriate entity may preferably access color amplifier gains for primary color channels 228 of camera device 110 based upon the identified scene illuminant by using any appropriate means. For example, color manager 416 may reference one or more lookup tables with the identified scene illuminant to determine the correct color amplifier gains for that illuminant. Color manager 416 or other appropriate entity may then preferably utilize the referenced color amplifier gains to adjust the gains of primary color channels 228, to thereby complete the white balance operation in accordance with the present invention.

The FIG. 9 embodiment is disclosed and discussed in the context of a digital still camera. However, in alternate embodiments, the present invention may readily be embodied in a computer device or any other type of electronic device that accesses and compensates for white-balance deviations in captured image data by utilizing the principles and techniques of the present invention.

Referring now to FIGS. 10A–D, a flowchart of method steps for performing a detailed neutral-core white-balance operation is shown, in accordance with one embodiment of the present invention. The FIGS. 10A–D embodiment is presented for purposes of illustration, and in alternate embodiments, the present invention may readily utilize various other steps and sequences than those discussed in conjunction with the FIGS. 10A–D embodiment. In FIGS. 10A–10D, a logical AND function may be expressed by the symbol "&&" which indicates that all specified conditions must be simultaneously true for the IF statement to be true. Furthermore, in the discussion of FIGS. 10A–10D and elsewhere in this document, the foregoing logical AND function may be expressed by the capitalized word "AND".

Figure 10A:
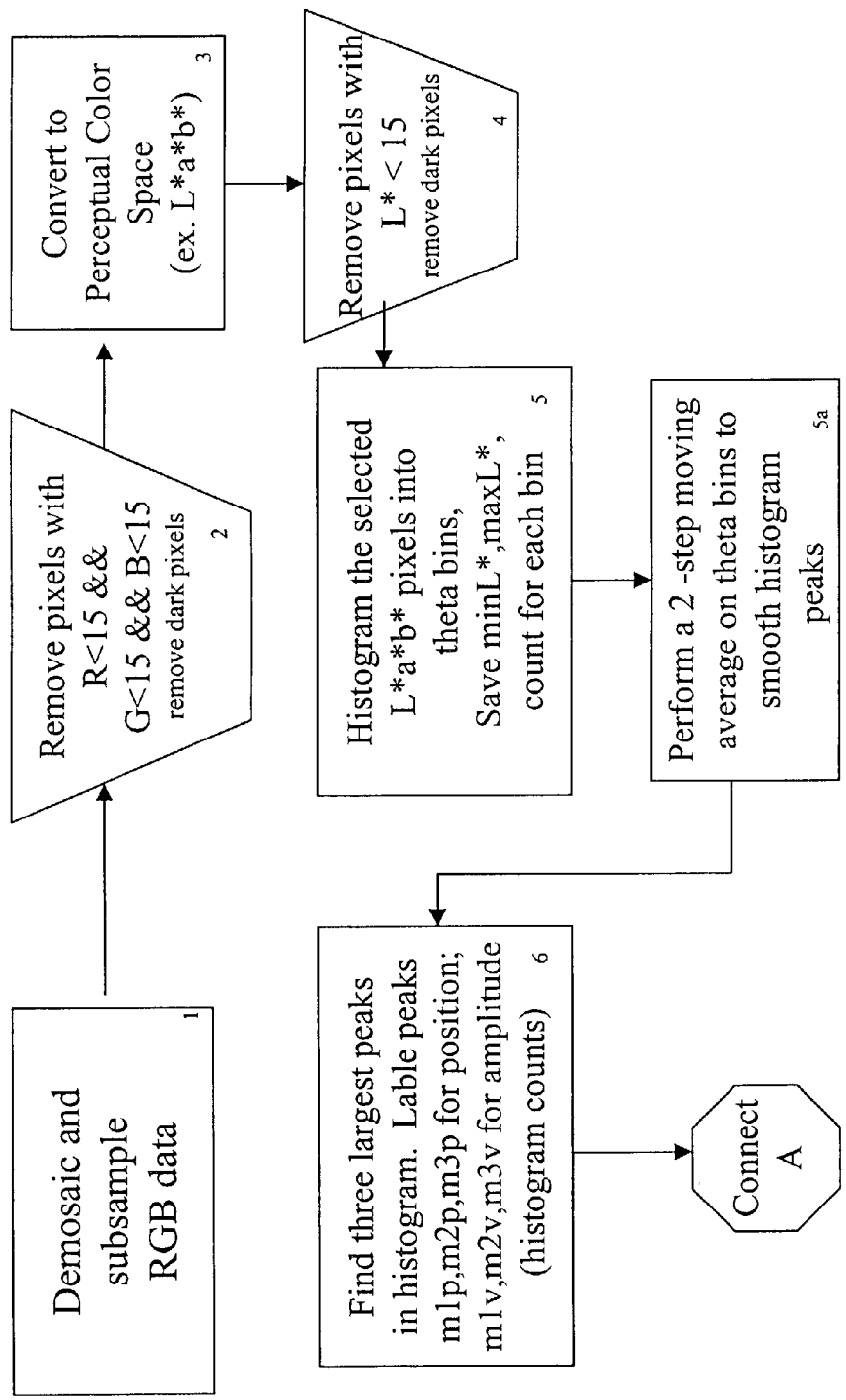
FIGS. 10A–D are a flowchart of method steps for performing a detailed neutral-core white-balance operation, in accordance with one embodiment of the present invention.

In the FIG. 10A embodiment, in step 1, a color manager 416 or another appropriate entity may preferably perform a demosaicing procedure upon a set of Red/Green/Blue (RGB) image data to generate or interpolate separate red, green, and blue values for each pixel by utilizing any effective technique. In other embodiments, the captured image data may be encoded in any other suitable format. For example, C/M/Y/G, which could then be reduced into a 3-color primary system, like R/G/B. In step 1, color manager 416 or another appropriate entity may also preferably perform a subsampling procedure to decimate the number of pixels in the captured image data, as discussed above in conjunction with FIG. 9.

In step 2, color manager 416 or another appropriate entity may preferably remove all pixels with a red value less than 15, AND a green value less than 15, AND a blue (B) value less than 15 from the demosaiced and subsampled image data. In other embodiments the threshold value of 15 may be implemented as any other effective threshold value. In step 3, color manager 416 or another appropriate entity may preferably convert the foregoing processed image data into a perceptual color space, such as L*a*b*, as discussed above in conjunction with FIG. 9.

In step 4, color manager 416 or another appropriate entity may preferably remove all pixels with a luminance (L*) value less than 15 from the perceptual color space data. Then, in step 5, color manager 416 or another appropriate entity may preferably histogram the selected perceptual color space pixels into theta bins, as discussed above in conjunction with FIGS. 6–9. In step 5, color manager 416 or another appropriate entity may also save a minimum luminance (minL*) and a maximum luminance (maxL*) count for each theta bin from histogram 710 for subsequently calculating a luminance range value for each theta bin.

In step 5a, color manager 416 or another appropriate entity may preferably perform a two-step moving average on peak values from neighboring theta bins to interpolate additional values and thereby smooth peaks in histogram 710. In step 6, color manager 416 or another appropriate entity may preferably locate the three largest peaks in histogram 710. In addition, color manager 416 or another appropriate entity may label the located peaks as m1p, m2p, and m3p to correspond to their relative positions in histogram 710, and may also label the located peaks as m1v, m2v, and m3v to correspond to their respective amplitudes or histogram counts. The FIG. 10A flowchart may then connect to letter "A" (step 7) of the FIG. 10B flowchart.

Figure 10B:
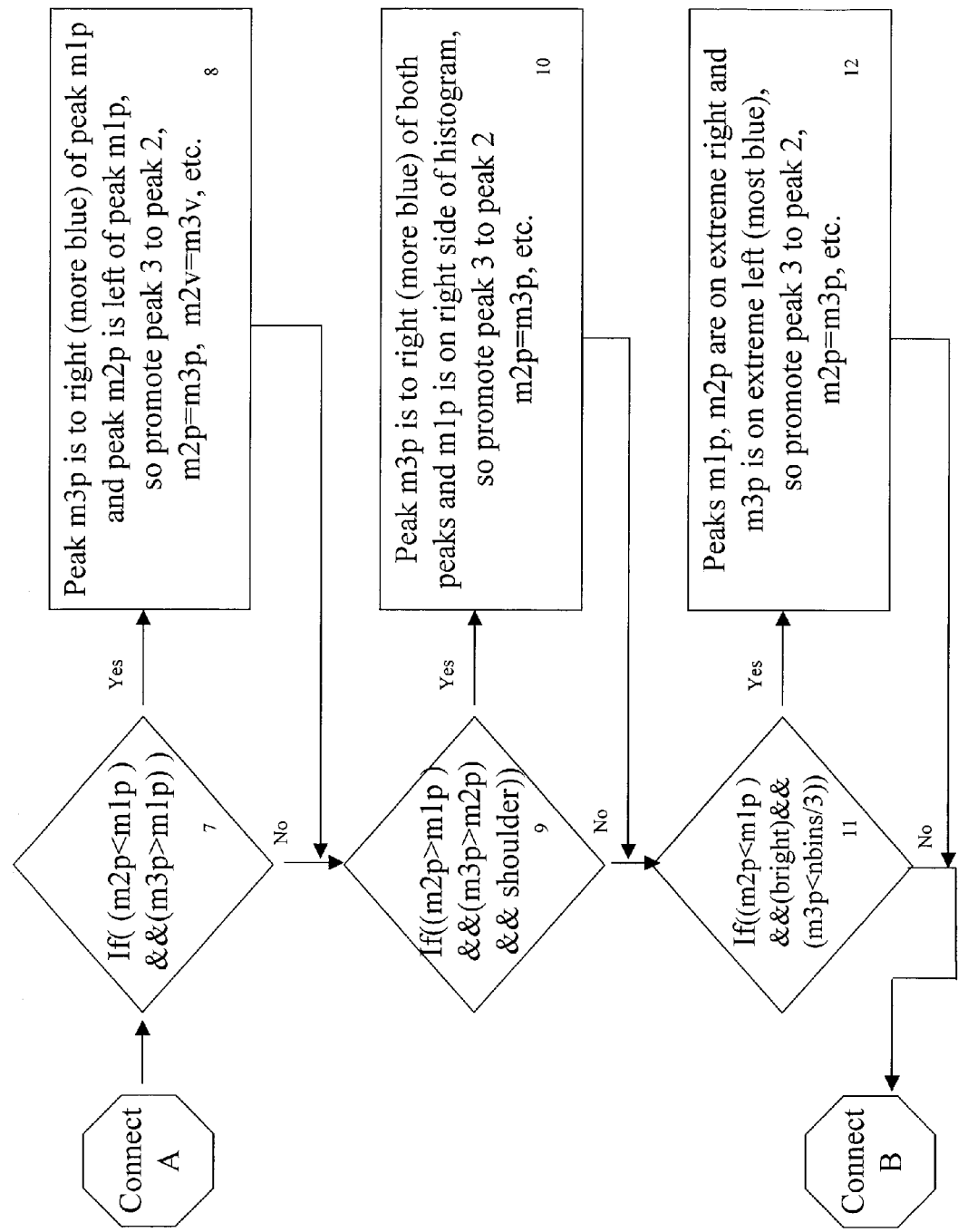

In step 7 of the FIG. 10B embodiment, color manager 416 or another appropriate entity may preferably determine whether m2p is less than m1p AND m3p is greater than m1p. If the conditions of step 7 are true, then in step 8, color manager 416 or another appropriate entity may preferably promote peak 3 to peak 2 (set m2p equal to m3p, and set m2v equal to m3v) because peak m3p is to the right (more blue) of peak m1p, and peak m2p is left of peak m1p.

Next, in step 9, color manager 416 or another appropriate entity may preferably determine whether m2p is greater than m1p, AND m3p is greater than m2p, AND a shoulder condition exists in which m3p must be greater than a shoulder threshold value of m2p. These "shoulder" conditions pertain to all placements of peaks relative to one another, when the promotion of a peak is being considered. If the conditions of step 9 are true, then in step 10, color manager 416 or another appropriate entity may preferably promote peak 3 to peak 2 (set m2p equal to m3p, and set m2v equal to m3v) because peak m3p is to the right (more blue) of both other peaks, and peak m1p is on the right side of histogram 710.

Next, in step 11, color manager 416 or another appropriate entity may preferably determine whether m2p is less than m1p, AND a relatively bright luminance condition exists, AND m3p is less than the number of theta bins divided by 3. If the conditions of step 11 are true, then in step 12, color manager 416 or another appropriate entity may preferably promote peak 3 to peak 2 (set m2p equal to m3p, and set m2v equal to m3v) because peaks m1p and m2p are on extreme right of histogram 710, and peak m3p is on the extreme left side (most blue) of histogram 710. The FIG. 10B flowchart may then connect to letter "B" (step 13a) of the FIG. 10C flowchart.

Figure 10C:
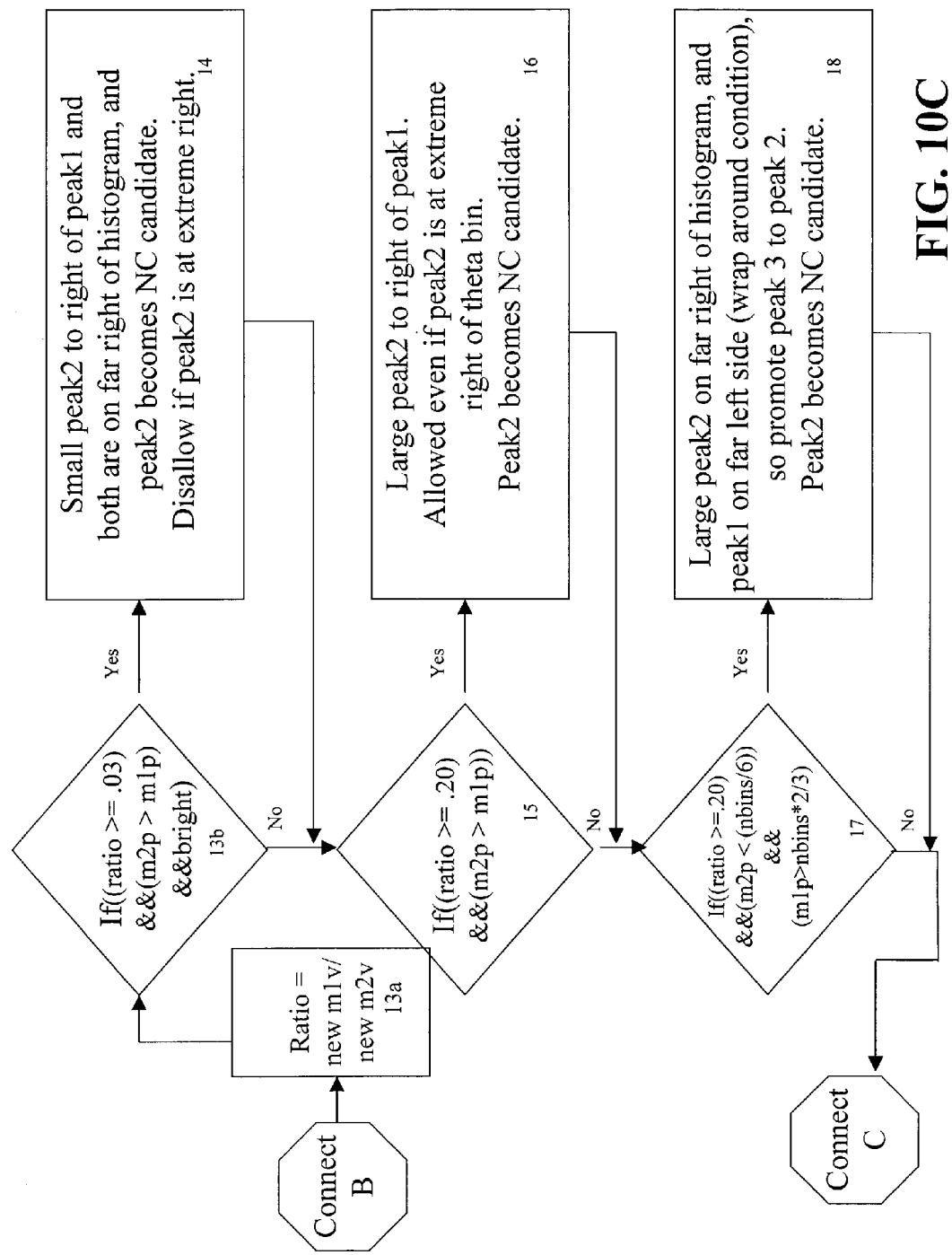

In step 13a of the FIG. 10C flowchart, color manager 416 or another appropriate entity may preferably set a Ratio equal to the current value of m1v divided by the current value of m2v, as discussed above in conjunction with FIG. 6. Then, in step 13b, color manager 416 or another appropriate entity may preferably determine whether the foregoing Ratio is greater than or equal to 0.03, AND m2p is greater than m1p, AND a relatively bright luminance condition exists. If the conditions of step 13b are true, then in step 14, color manager 416 or another appropriate entity may preferably identify peak m2p as the neutral core peak candidate, because there is a small peak m2p to the right of peak m1p, and both peaks m1p and m2p are on far right of histogram 710. However, the selection may be disallowed if peak m2p is at the extreme right of histogram 710.

Next, in step 15, color manager 416 or another appropriate entity may preferably determine whether the foregoing Ratio is greater than or equal to 0.20, AND m2p is greater than m1p. If the conditions of step 15 are true, then in step 16, color manager 416 or another appropriate entity may preferably identify peak m2p as the neutral core peak candidate, because there is a large peak m2p to the right of peak m1p. The selection may be allowed even if peak m2p is at the extreme right of histogram 710.

In step 17, color manager 416 or another appropriate entity may preferably determine whether the foregoing Ratio is greater than or equal to 0.20, AND m2p is less than the number of theta bins divided by 6, AND m1p is greater than the number of theta bins times two-thirds. If the conditions of step 17 are true, then in step 18, color manager 416 or another appropriate entity may preferably promote peak m3p to peak m2p, and then may preferably identify the new peak m2p as the neutral core peak candidate, because there is a large peak m2p on the far right of histogram 710, and peak m1p is on far left side of histogram 710 in a "wrap-around" condition. The FIG. 10C flowchart may then connect to letter "C" (step 19) of the FIG. 10D flowchart.

Figure 10D:
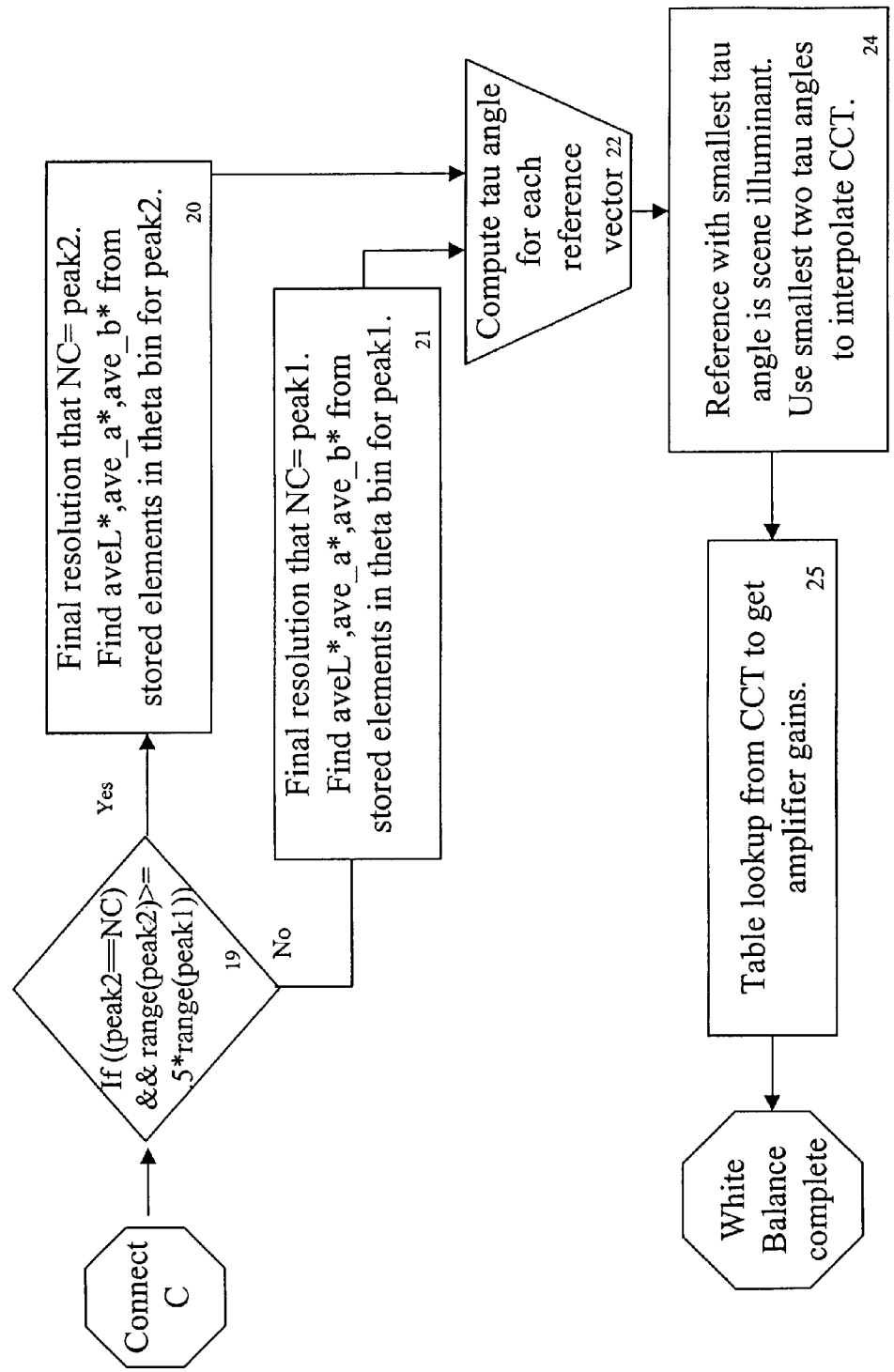

In step 19 of the FIG. 10D flowchart, color manager 416 or another appropriate entity may preferably determine whether peak m2p has previously been identified as the neutral core peak candidate, AND the luminance range of peak m2p is greater than or equal to 0.5 times the range of peak m1p. If the conditions in step 19 are satisfied, then in step 20, color manager 416 or another appropriate entity may preferably make a final determination that peak m2p is identified as the neutral core peak. Color manager 416 or another appropriate entity may then calculate averages, aveL*, ave_a*, and ave_b*, from stored elements in the theta bin for peak m2p to define coordinates for a neutral core vector 814.

However, if the conditions in step 19 are not satisfied, then in step 21, color manager 416 or another appropriate entity may preferably make a final determination that peak m1p is identified as the neutral core peak. Color manager 416 or another appropriate entity may then calculate averages, aveL*, ave_a*, and ave_b*, from stored elements in the theta bin for peak m1p to define coordinates for a neutral core vector 814. In step 22, color manager 416 or another appropriate entity may preferably compute a tau angle 826 between each reference vector 818 and the foregoing neutral core vector 814.

In step 24, color manager 416 or another appropriate entity may preferably identify the reference vector 818 with the smallest tau angle 826 as the scene illuminant for the captured image data. In the FIG. 10D embodiment, color manager 416 or another appropriate entity may preferably utilize the two smallest tau angles 826 to interpolate a Correlated Color Temperature (CCT) for the identified scene illuminant. In step 25, color manager 416 or another appropriate entity may preferably perform a table lookup procedure for the CCT to obtain standard amplifier gains for the particular scene illuminant. Color manager 416 or another appropriate entity may then adjust the amplifier gains of primary color channels 228 in accordance with the standard amplifier gains to complete the white balance operation.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for efficiently performing a white balancing operation, comprising:
   an imaging device configured to provide captured image data corresponding to a photographic image; and
   a color manager configured to convert said captured image data into perceptual color space data, said color manager creating a histogram of chromaticity vectors corresponding to said perceptual color space data, said color manager next deriving a neutral core vector corresponding to a neutral core peak from said histogram, said color manager utilizing said neutral core vector to identify a scene illuminant corresponding to color channel amplifier gains, said color manager then adjusting said captured image data with said color channel amplifier gains to thereby complete said white balancing operation, said color manager removing RGB pixels with a red value less than 15, and a green value less than 15, and a blue (B) value less than 15 from said captured image data, said color manager saving a minimum luminance (minL*) and a maximum luminance (maxL*) count for theta bins from said histogram for subsequently calculating a luminance range value for each of said theta bins.

2. The system of claim 1 wherein said imaging device and said color manager are implemented as part of an electronic camera device.

3. The system of claim 1 wherein said color manager decimates said captured image data to reduce a pixel total for said captured image data, said color manager then converting said captured image data into said perceptual color space data.

4. The system of claim 1 wherein said color manager identifies said chromaticity vectors by calculating theta angles which define color characteristics of pixels in said perceptual color space data, said color manager then creating said histogram by defining theta bins which each store chromaticity vector counts that correspond to different theta angles of said chromaticity vectors, said histogram plotting a sequence of said theta bins versus said chromaticity vector counts.

5. The system of claim 1 wherein said color manager identifies said neutral core peak from said histogram by determining appropriate chromaticity characteristics for said neutral core peak, said color manager calculating said neutral core vector by averaging luminance coordinates and color coordinates for said chromaticity vectors that correspond to said neutral core peak.

6. The system of claim 1 wherein said color manager analyzes said histogram to locate a maximum blue chromaticity region which corresponds to an optimal location for said neutral core peak, said color manager identifying a candidate peak which is closest to said maximum blue chromaticity region as said neutral core peak.

7. The system of claim 1 wherein said color manager compares said neutral core vector with reference vectors corresponding to known standard illuminants to thereby identify said scene illuminant, said color manager calculating theta angles between said neutral core vector and each of said reference vectors, said scene illuminant corresponding to one of said reference vectors with a smallest one of said theta angles.

8. The system of claim 1 wherein said color manager accesses said color channel amplifier gains corresponding to said scene illuminant by referencing a lookup table, said color manager adjusting primary color channels of said imaging device with said color channel amplifier gains to thereby complete said white balancing operation.

9. The system of claim 1 wherein said color manager performs a demosaicing procedure upon a set of Red/Green/Blue (RGB) image data to interpolate separate red, green, and blue values for each pixel location, said color manager also performing a subsampling procedure to decimate a pixel total in said captured image data.

10. The system of claim 9 wherein said color manager removes said RGB pixels with said red value less than 15, and said green value less than 15, and said blue (B) value less than 15 from said captured image data during a pixel decimation procedure.

11. The system of claim 10 wherein said color manager converts said captured image data into said perceptual color space data which is configured in an L*a*b* format.

12. The system of claim 11 wherein said color manager removes perceptual color spade pixels with a luminance (L*) value that is less than 15 from said perceptual color space data.

13. The system of claim 12 wherein said color manager creates said histogram by calculating said chromaticity vectors, said color manager then histogramming said perceptual color space pixels into theta bins according to theta angles of said chromaticity vectors.

14. The system of claim 13 wherein said color manager calculates and saves said minimum luminance (minL*) and said maximum luminance (maxL*) count for said each of said theta bins from said histogram for subsequently calculating said luminance range value for said each of said theta bins.

15. A system for efficiently performing a white balancing operation, comprising:
an imaging device configured to provide captured image data corresponding to a photographic image; and
a color manager configured to convert said captured image data into perceptual color space data, said color manager creating a histogram of chromaticity vectors corresponding to said perceptual color space data, said color manager next deriving a neutral core vector corresponding to a neutral core peak from said histogram, said color manager utilizing said neutral core vector to identify a scene illuminant corresponding to color channel amplifier gains, said color manager then adjusting said captured image data with said color channel amplifier gains to thereby complete said white balancing operation, said color, manager performing a demosaicing procedure upon a set of Red/Green/Blue (RGB) image data to interpolate separate red, green, and blue values for each pixel location, said color manager also performing a subsampling procedure to decimate a pixel total in said captured image data, said color manager removing RGB pixels with a red value less than 15, and a green value less than 15, and a blue (B) value less than 15 from said captured image data, said color manager converting said captured image data into said perceptual color space data which is configured in an L*a*b* format, said color manager removing perceptual color space pixels with a luminance (Li value that is less than 15 from said perceptual color space data, said color manager creating said histogram by calculating said chromaticity vectors, said color manager then histogramming said perceptual color space pixels into theta bins according to theta angles of said chromaticity vectors, said color manager saving a minimum luminance (minL*) and a maximum luminance (maxL*) count for each of said theta bins from said histogram for subsequently calculating a luminance range value for said each of said theta bins, said color manager performing a two-step moving average on peak values from neighboring theta bins to interpolate additional values and thereby smooth adjacent peaks in said histogram.

16. The system of claim 15 wherein said color manager identifies three largest peaks in said histogram as peak 1, peak 2, and peak 3.

17. The system of claim 16 wherein said color manager labels said three largest peaks as m1p, m2p, and m3p to correspond to their relative positions in said histogram, said color manager also labeling said three largest peaks as m1v, m2v, and m3v to correspond to their respective amplitudes.

18. The system of claim 17 wherein said color manager performs a first promotion procedure by promoting said peak 3 to become said peak 2, which sets promotion procedure by promoting said peak 3 to become said peak 2, which sets m2p equal to m3p, and which sets m2v equal to m3v, said color manager performing said first promotion procedure whenever m2p is less than m1p, and m3p is greater than m1p.

19. The system of claim 18 wherein said color manager performs a second promotion procedure by promoting said peak 3 to become said peak 2, which sets m2p equal to m3p, and which sets m2v equal to m3v, said color manager performing said second promotion procedure whenever m2p is greater than m1p, and m3p is greater than m2p, and a shoulder condition exists in which a blue peak wraps around from the highest end of said histogram to a lowest end of said histogram.

20. The system of claim 19 wherein said color manager performs a third promotion procedure to promote said peak 3 to said peak 2, which sets m2p equal to m3p, and which sets m2v equal to m3v, said color manager performing said third promotion procedure whenever m2p is less than m1p, and a first relatively bright luminance condition exists, and m3p is less than a total number of said theta bins divided by 3.

21. The system of claim 20 wherein said color manager calculates a ratio to be equal to a current value of m1v divided by a current value of m2v.

22. The system of claim 21 wherein said color manager identifies said peak 2 as a neutral core peak candidate whenever said ratio is greater than or equal to 0.03, and m2p is greater than m1p, and a second relatively bright luminance condition exists.

23. The system of claim 22 wherein said color manager identifies said peak 2 as said neutral core peak candidate whenever said ratio is greater than or equal to 0.20, and m2p is greater than m1p.

24. The system of claim 23 wherein said color manager promotes said peak 3 to become said peak 2, and then identifies said peak 2 as said neutral core peak candidate, whenever said ratio is greater than or equal to 0.20, and m2p is less than a total number of said theta bins divided by 6, and m1p is greater than said total number of said theta bins times two-thirds.

25. The system of claim 24 wherein said color manager performs a final determination procedure to indicate that said peak 2 is identified as said neutral core peak, said color manager then calculating averages, aveL*, ave_a*, and ave_b*, from stored elements in a peak 2 theta bin for said peak 2 to define coordinates for said neutral core vector, said color manager performing said final determination procedure whenever said peak 2 has previously been identified as said neutral core peak candidate, and a first luminance range of said peak 2 is greater than or equal to 0.5 times a second luminance range of said peak 1.

26. The system of claim 24 wherein said color manager performs a final determination procedure to indicate that said peak 1 is identified as said neutral core peak, said color manager then calculating said averages, aveL*, ave_a* and ave_b*, from said stored elements in a peak 1 theta bin for said peak 1 to define said coordinates for said neutral core vector, said color manager performing said final determination procedure whenever said peak 2 has not previously been identified as said neutral core peak candidate, or whenever said first luminance range of said peak 2 is not greater than or equal to 0.5 times said second luminance range of said peak 1.

27. The system of claim 26 wherein said color manager computes tau angles between reference vectors for known illuminants and said neutral core vector.

28. The system of claim 27 wherein said color manager identifies a scene illuminant reference vector with a smallest tau angle as said scene illuminant for said captured image data.

29. The system of claim 28 wherein said color manager utilizes two smallest ones of said tau angles to interpolate a correlated color temperature for said scene illuminant.

30. The system of claim 29 wherein said color manager performs a table lookup procedure for said correlated color temperature to obtain said color channel amplifier gains for said scene illuminant, said color manager then adjusting amplifier gains of primary color channels in accordance with said color channel amplifier gains to complete said white balancing operation.

31. A method for efficiently performing a white balancing operation, comprising the steps of:
providing captured image data from an imaging device, said captured image data corresponding to a photographic image;
converting said captured image data into perceptual color space data;
creating a histogram of chromaticity vectors corresponding to said perceptual color space data by utilizing a color manager;
deriving a neutral core vector corresponding to a neutral core peak from said histogram by utilizing said color manager;
utilizing said neutral core vector to identify a scene illuminant corresponding to color channel amplifier gains; and
adjusting said captured image data with said color channel amplifier gains to thereby complete said white balancing operation, said color manager removing RGB pixels with a red value less than approximately 15, and a green value less than approximately 15, and a blue (B) value less than approximately 15 from said captured image data, said color manager saving a minimum luminance (minL*) and a maximum luminance (maxL*) count for theta bins from said histogram for subsequently calculating a luminance range value for each of said theta bins.

32. The method of claim 31 wherein said imaging device and said color manager are implemented as part of an electronic camera device.

33. The method of claim 31 wherein said color manager decimates said captured image data to reduce a pixel total for said captured image data, said color manager then converting said captured image data into said perceptual color space data.

34. The method of claim 31 wherein said color manager identifies said chromaticity vectors by calculating theta angles which define color characteristics of pixels in said perceptual color space data, said color manager then creating said histogram by defining theta bins which each store chromaticity vector counts that correspond to different theta angles of said chromaticity vectors, said histogram plotting a sequence of said theta bins versus said chromaticity vector counts.

35. The method of claim 31 wherein said color manager identifies said neutral core peak from said histogram by determining appropriate chromaticity characteristics for said neutral core peak, said color manager calculating said neutral core vector by averaging luminance coordinates and color coordinates for said chromaticity vectors that correspond to said neutral core peak.

36. The method of claim 31 wherein said color manager analyzes said histogram to locate a maximum blue chromaticity region which corresponds to an optimal location for said neutral core peak, said color manager identifying a candidate peak which is closest to said maximum blue chromaticity region as said neutral core peak.

37. The method of claim 31 wherein said color manager compares said neutral core vector with reference vectors corresponding to known standard illuminants to thereby identify said scene illuminant, said color manager calculating theta angles between said neutral core vector and each of said reference vectors, said scene illuminant corresponding to one of said reference vectors with a smallest one of said theta angles.

38. The method of claim 31 wherein said color manager accesses said color channel amplifier gains corresponding to said scene illuminant by referencing a lookup table, said color manager adjusting primary color channels of said imaging device with said color channel amplifier gains to thereby complete said white balancing operation.

39. The method of claim 31 wherein said color manager performs a demosaicing procedure upon a set of color primary image data, including at least three color channels, to interpolate separate color primary values for each pixel location, said color manager also performing a subsampling procedure to decimate a pixel total in said captured image data.

40. The method of claim 39 wherein said color manager removes said RGB pixels with said red value less than 15, and said green value less than 15, and said blue (B) value less than 15 from said captured image data during a pixel decimation procedure.

41. The method of claim 40 wherein said color manager converts said captured image data into said perceptual color space data which is configured in an L*a*b* format.

42. The method of claim 41 wherein said color manager removes perceptual color space pixels with a luminance (L*) value that is less than approximately 15 from said perceptual color space data.

43. The method of claim 42 wherein said color manager creates said histogram by calculating said chromaticity vectors, said color manager then histogramming said perceptual color space pixels into theta bins according to theta angles of said chromaticity vectors.

44. The method of claim 43 wherein said color manager calculates and saves said minimum luminance (minL*) and said maximum luminance (maxL*) count for said each of said theta bins from said histogram for subsequently calculating said luminance range value for said each of said theta bins.

45. A method for efficiently performing a white balancing operation, comprising the steps of:
providing captured image data from an imaging device, said captured image data corresponding to a photographic image;
converting said captured image data into perceptual color space data;
creating a histogram of chromaticity vectors corresponding to said perceptual color space data by utilizing a color manager;
deriving a neutral core vector corresponding to a neutral core peak from said histogram by utilizing said color manager;
utilizing said neutral core vector to identify a scene illuminant corresponding to color channel amplifier gains; and
adjusting said captured image data with said color channel amplifier gains to thereby complete said white balancing operation, said color manager performing a demosaicing procedure upon a set of color primary image data, including at least three color channels, to interpolate separate color primary values for each pixel location, said color manager also performing a subsampling procedure to decimate a pixel total in said captured image data, said color manager removing RGB pixels with a red value less than approximately 15, and a green value less than approximately 15, and a blue (Bi value less than approximately 15 from said captured image data, said color manager converting said captured image data into said perceptual color space data which is configured in an L*a*b* format, said color manager removing perceptual color space pixels with a luminance (L*) value that is less than approximately 15 from said perceptual color space data, said color manager creating said histogram by calculating said chromaticity vectors, said color manager then histogramming said perceptual color space pixels into theta bins according to theta angles of said chromaticity vectors, said color manager saving a minimum luminance (minL*) and a maximum luminance (maxL*) count for each of said theta bins from said histogram for subsequently calculating a luminance range value for said each of said theta bins, said color manager performing a data smoothing process on peak values from neighboring theta bins to interpolate additional values and thereby smooth adjacent peaks in said histogram.

46. The method of claim 45 wherein said color manager identifies three largest peaks in said histogram as peak 1, peak 2, and peak 3.

47. The method of claim 46 wherein said color manager labels said three largest peaks as m1p, m2p, and m3p to correspond to their relative positions in said histogram, said color manager also labeling said three largest peaks as m1v, m2v, and m3v to correspond to their respective amplitudes.

48. The method of claim 47 wherein said color manager performs a first promotion procedure by promoting said peak 3 to become said peak 2, which sets m2p equal to m3p, and which sets m2v equal to m3v, said color manager performing said first promotion procedure whenever m2p is less than m1p, and m3p is greater than m1p.

49. The method of claim 48 wherein said color manager performs a second promotion procedure by promoting said peak 3 to become said peak 2, which sets m2p equal to m3p, and which sets m2v equal to m3v, said color manager performing said second promotion procedure whenever m2p is greater than m1p, and m3p is greater than m2p, and a shoulder condition exists in which a blue peak wraps around from the highest end of said histogram to a lowest end of said histogram.

50. The method of claim 49 wherein said color manager performs a third promotion procedure to promote said peak 3 to said peak 2, which sets m2p equal to m3p, and which sets m2v equal to m3v, said color manager performing said third promotion procedure whenever m2p is less than m1p, and a first relatively bright luminance condition exists, and m3p is less than a total number of said theta bins divided by approximately 3.

51. The method of claim 50 wherein said color manager calculates a ratio to be equal to a current value of m1v divided by a current value of m2v.

52. The method of claim 51 wherein said color manager identifies said peak 2 as a neutral core peak candidate whenever said ratio is greater than or equal to approximately 0.03, and m2p is greater than m1p, and a second relatively bright luminance condition exists.

53. The method of claim 52 wherein said color manager identifies said peak 2 as said neutral core peak candidate whenever said ratio is greater than or equal approximately 0.20, and m2p is greater than m1p.

54. The method of claim 53 wherein said color manager promotes said peak 3 to become said peak 2, and then identifies said peak 2 as said neutral core peak candidate, whenever said ratio is greater than or equal to approximately 0.20, and m2p is less than a total number of said theta bins divided by approximately 6, and m1p is greater than said total number of said theta bins times approximately two-thirds.

55. The method of claim 54 wherein said color manager performs a final determination procedure to indicate that said peak 2 is identified as said neutral core peak, said color manager then calculating averages, aveL*, ave_a*, and ave_b* from stored elements in a peak 2 theta bin for said peak 2 to define coordinates for said neutral core vector, said color manager performing said final determination procedure whenever said peak 2 has previously been identified as said neutral core peak candidate, and a first luminance range of said peak 2 is greater than or equal to approximately 0.5 times a second luminance range of said peak 1.

56. The method of claim 54 wherein said color manager performs a final determination procedure to indicate that said peak 1 is identified as said neutral core peak, said color manager then calculating said averages, aveL*, ave_a*, and ave_b* from stored elements in a peak 1 theta bin for said peak 1 to define said coordinates for said neutral core vector, said color manager performing said final determination procedure whenever said peak 2 has not previously been identified as said neutral core peak candidate, or whenever said first luminance range of said peak 2 is not greater than or equal to approximately 0.05 times said second luminance range of said peak 1.

57. The method of claim 56 wherein said color manager computes tau angles between reference vectors for known illuminants and said neutral core vector.

58. The method of claim 57 wherein said color manager identifies a scene illuminant reference vector with a smallest tau angle as said scene illuminant for said captured image data.

59. The method of claim 58 wherein said color manager utilizes two smallest ones of said tau angles to interpolate a correlated color temperature for said scene illuminant.

60. The method of claim 59 wherein said color manager performs a table lookup procedure for said correlated color temperature to obtain said color channel amplifier gains for said scene illuminant, said color manager then adjusting amplifier gains of primary color channels in accordance with said color channel amplifier gains to complete said white balancing operation.

61. A computer-readable medium comprising program instructions for performing a white balancing operation by performing the steps of:
providing captured image data from an imaging device, said captured image data corresponding to a photographic image;
converting said captured image data into perceptual color space data;
creating a histogram of chromaticity vectors corresponding to said perceptual color space data by utilizing a color manager;
deriving a neutral core vector corresponding to a neutral core peak from said histogram by utilizing said color manager;
utilizing said neutral core vector to identify a scene illuminant corresponding to color channel amplifier gains; and
adjusting said captured image data with said color channel amplifier gains to thereby complete said white balancing operation, said color manager removing RGB pixels with a red value less than approximately 15, and a green value less than approximately 15, and a blue (B) value less than approximately 15 from said captured image data, said color manager saving a minimum luminance (minL*) and a maximum luminance (maxL*) count for theta bins from said histogram for subsequently calculating a luminance range value for each of said theta bins.

62. A system for efficiently performing a white balancing operation, comprising:
   means for providing captured image data corresponding to a photographic image;
   means for converting said captured image data into perceptual color space data;
   means for creating a histogram of chromaticity vectors corresponding to said perceptual color space data;
   means for deriving a neutral core vector corresponding to a neutral core peak from said histogram;
   means for utilizing said neutral core vector to identify a scene illuminant corresponding to color channel amplifier gains; and
   means for adjusting said captured image data with said color channel amplifier gains to thereby complete said white balancing operation.

63. A system for efficiently performing a white balancing operation, comprising:

means for providing captured image data corresponding to a photographic image; and a color manager configured to derive a neutral core vector corresponding for said captured image data, said color manager utilizing said neutral core vector to identify a scene illuminant for adjusting said captured image data to thereby complete said white balancing operation, said color manager removing RGB pixels with a red value less than approximately 15, and a green value less than approximately 15, and a blue (B) value less than approximately 15 from said captured image data, said color manager saving a minimum luminance (minL*) and a maximum luminance (maxL*) count for theta bins from a histogram of said captured image data for subsequently calculating a luminance range value for each of said theta bins.

* * * * *